Figure 1:
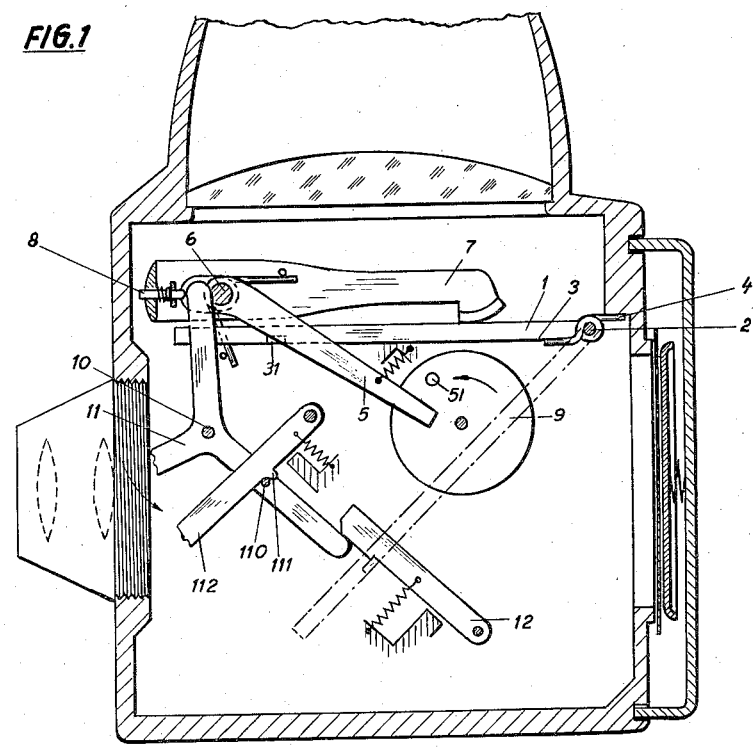

Dec. 2, 1958  P. W. HENNIG ET AL  2,862,429
REFLEX CAMERAS
Filed Aug. 16, 1955  2 Sheets-Sheet 1

INVENTORS
Paul Walter HENNIG and
Erich Kurt RICHTER
BY

United States Patent Office 2,862,429
Patented Dec. 2, 1958

2,862,429

REFLEX CAMERAS

Paul Walter Hennig and Erich Kurt Richter, Dresden, Germany, assignors to VEB Zeiss Ikon, Dresden, Germany Application August 16, 1955, Serial No. 528,789

15 Claims. (Cl. 95—42)

This invention relates to a reflex camera with coupled winding gear for film transport, shutter setting and actuation of the mirror, to which interchangeable lenses of different focal lengths can be attached.

A gear of this type is actuated by means of a central handle or by a spring mechanism or a motor, the film transport, the winding of the shutter and actuation of the mirror occurring rhythmically. Likewise, at release of the shutter the mirror is turned out of the path of rays of the lens in dependence upon this release. Such arrangements afford the advantage that none of the various operations can be forgotten or carried out at the wrong moment. If equipped for taking interchangeable lenses of different focal lengths, the camera will be adapted to the standard objective most in use with its focal length equal, or nearly so, to the size diagonal. In this case, lenses of short focal length, as wide angle or special lenses for stereoexposures and the like, will project into the space of motion of the mirror, so that the reflex finder cannot be used, the mirror must remain in upturned position and an auxiliary finder is required. This problem can be solved in known manner by connecting the mirror with the winding gear by a releasable coupling in such manner that at insertion of a short focus lens a lever disconnects the coupling between mirror and gear and thus prevents movement of the mirror into finder position. This arrangement, however, has the disadvantage that a short focus lens can be inserted only after the mirror has been moved out of the path of rays to save it from being damaged or broken.

To prevent this trouble it is proposed to effect release of the lock holding the mirror in taking position by the same member which disconnects the coupling between the mirror and winding gear when a short focus lens is inserted.

It is further possible to uncouple the mirror or its holder from the winding gear and to disengage it while in finder position by providing on its shaft a rotatable holding arm which can be coupled with the mirror or its holder. To permit coupling this arm or the holder of the mirror is displaceably arranged on the shaft. This is a particularly suitable arrangement if the mirror when moving up is to release the shutter.

It is further proposed to make inoperativeness of the mirror not directly dependent upon the lens, since this would be quite complicated and expensive, but to provide instead a handle on or within the camera so as to be manually accessible only when the lens is taken off. This construction will reduce the cost of the camera for the majority of users who do not possess lenses of short focal length while the others who can afford them will appreciate a convenient stopping means.

Figure 3:
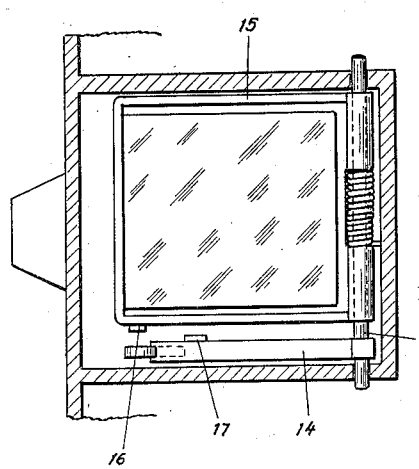
Figure 2:
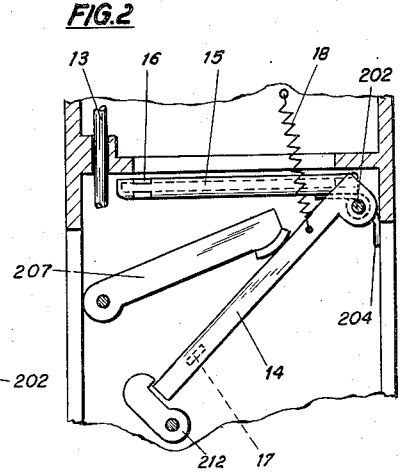
Figure 1A:
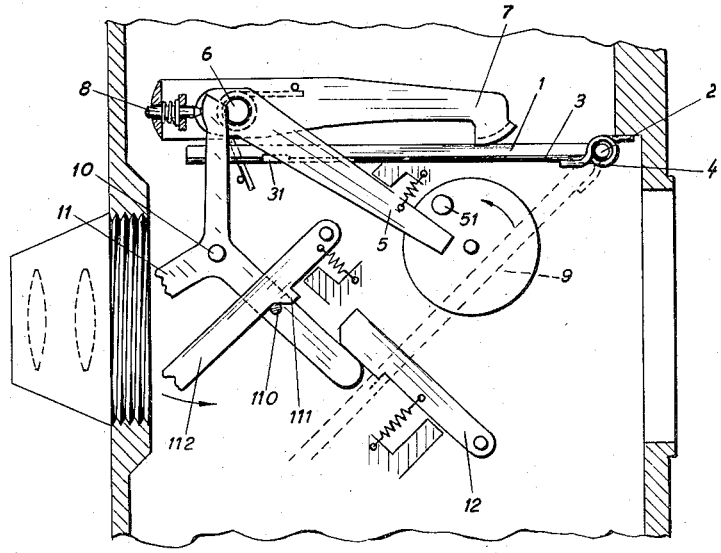
Figure 1B:
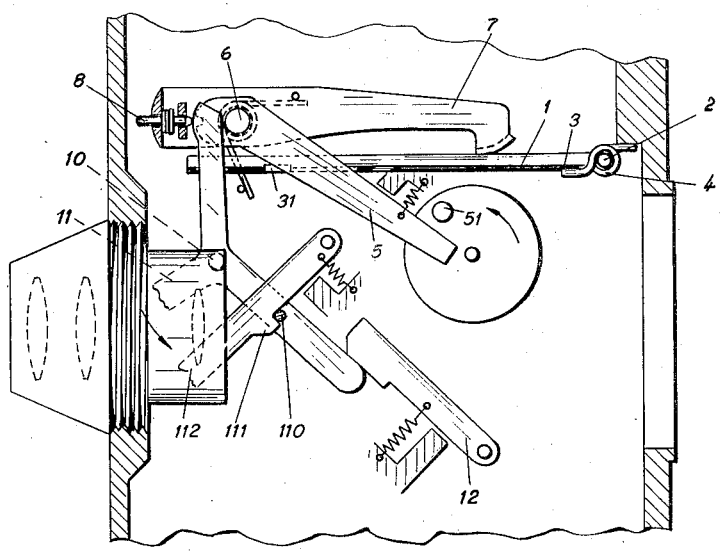

Two embodiments of the invention are diagrammatically illustrated in the accompanying drawings, wherein Figure 1 shows an arrangement according to the invention, in which a driving member moving the mirror holder can be uncoupled from the winding gear;

Fig. 1a is a fragmentary sectional view on an enlarged scale similar to that shown in Fig. 1, Fig. 1b is a fragmentary sectional view similar to that shown in Fig. 1a, wherein, however, the controlling means are set in such a position that the mirror is held in its inoperative position permitting the attachment of a lens mount projecting substantially into the interior of the camera casing, Fig. 2 shows another embodiment according to the invention with a different arrangement of the coupling means, and Fig. 3 is a top plan view of the construction shown in Fig. 2.

In Fig. 1 the mirror 1 is disposed in a camera body in a holder 3 which can turn about the shaft 2 and which is subject to the action of the spring 4. The spring 4 urges the holder 3 and the mirror 1 against the lever 7, which limits the inoperative position of the mirror shown in full lines. During the winding operation the lever 5 is moved about the shaft 6 in the direction of the arrow by the drive 51, and the lever 7 resting on the holder 3 is also movable about the shaft 6. By means of the coupling 8, being in the shape of a spring-loaded pin capable of engagement with a recess in the lever 5 (see Figs. 1 and 1a), the levers 5 and 7 are connected with each other to form a rigid bell crank lever, and at actuation of the lever 5 by the driving pin 51 the mirror 1 is turned from its inoperative position shown in full lines into its operative position 9 shown in dash lines, and held therein in front of the holding lever 12 which places itself behind the nose 31 on the holder 3. If the mirror actuating means shall be rendered ineffective, the spring-loaded coupling pin 8 is disengaged from the recess of the lever 5 (see Fig. 1b) by a left-hand rotation of the lever 11 which is movable about the shaft 10. After the pin 110 on the lever 11 has engaged behind the nose 111 of the spring loaded lever 112 (see Fig. 1b) the coupling pin 8 remains in its disengaged position and the mirror 1 does not move when the lever 5 is actuated. If, on the other hand, the elements, with exception of the mirror are in the full line position shown in Fig. 1a and said mirror is in its operative position 9 shown in dash lines, and, if, then the same lever 11 is rotated in left-hand direction it effects a disconnection of the holding lever 12 from the nose 31 of the mirror whereupon the mirror, due to the action of the spring 4, returns automatically into its inactive position, so that lenses projecting inwardly into the path of the mirror can be inserted (see for example the lens shown in Fig. 1b).

In the arrangement shown in Figs. 2 and 3 the shaft 202 supports besides the mirror holder 15 a rotatable holding arm 14, the holder 15 being axially displaceably arranged on the shaft 202 to enable the fork 16 of the holder 15 to engage the nose 17 of the arm 14, whereby the holder 15 and the arm 14 are connected.

When it is desired to stop the mirror actuating means, the holder 15 is displaced by suitable means (not shown) on the shaft 202 to bring the fork 16 out of engagement with the nose 17. The mirror holder 15, due to the action of spring 204, will then return to position of rest and there is space again for projecting lenses. The arm 14 is connected also with the lever 207 moved by the winding gear, not shown, and brought into working position at every winding operation. At actuation of the camera release, not shown, the lever 212 releases the arm 14 which, due to the action of spring 18, releases the shutter, not shown, by striking against the bolt 13.

The arrangements shown in the two constructions may be varied within the scope of the invention. It is possible for instance to displace in the construction of Fig. 1 the mirror holder 3 on the shaft 2 by a control lever (not shown) to prevent engagement of the holding lever 12 with the nose 31 of the holder 3. Furthermore, the lever 7 may be displaced by a control lever (not shown) so as not to contact the holder 3. Moreover, the device shown in Figs. 2 and 3 may be constructed in such a way that the arm 14 is movable relative to the holder 15 for engaging or disengaging the coupling means 16, 17, instead of above described displacement of the holder 15 relative to the arm 14.

What we claim is:

1. In a reflex camera, the combination of: a casing, a light-reflecting mirror assembly swingably mounted in said casing for movements between an inoperative position and an operative position, actuatable driving means, movable actuating means, said driving means cooperating with said actuating means for displacing same in a predetermined relationship to the actuation of said drive means, disengageable coupling means capable of operatively connecting said actuating means with said mirror assembly for a movement of the latter from its inoperative position into its operative position in dependence on an actuation of said driving means, releasable locking means for holding said mirror assembly in its operative position, said coupling means rendering said mirror assembly independent of said driving means when said coupling means are in disengaged condition, and biasing means acting on said mirror assembly for urging same into its inoperative position.

2. In a reflex camera as claimed in claim 1, said driving means including a member of a film winding device.

3. In a reflex camera as claimed in claim 1, settable controlling means arranged for cooperation with said coupling means and said releasable locking means, said controlling means being movable between an inactive position and an active position for bringing said coupling means into disengaged condition and for bringing said locking means in releasing condition.

4. In a reflex camera as claimed in claim 3, second releasable locking means for holding said controlling means in its active position whereby said coupling means are held in their disengaged condition and said first locking means is held in its releasing condition.

5. In a reflex camera, the combination of: a casing, a light-reflecting mirror assembly swingably mounted in said casing for movements between an inoperative position, first actuating means movably mounted in said casing, second actuating means movably mounted in said casing, disengageable coupling means connected with said first and second actuating means, said coupling means positively connecting with each other said first and second actuating means when they are in engaged condition, said first actuating means being operatively connected with said mirror assembly, actuatable driving means arranged for cooperation with said second actuating means so as to move the latter in a predetermined relationship, said driving means being capable of moving said mirror asesmbly from its inactive position into its active position through the medium of said two actuating means when the coupling means are in engaged condition, releasable locking means for holding said mirror assembly in its operative position, said coupling means rendering said mirror assembly independent of said driving means when said coupling means are in disengaged condition, and biasing means acting on said mirror assembly for urging same into its operative position.

6. In a reflex camera a claimed in claim 5, said driving means including a member of a film winding device.

7. In a reflex camera as claimed in claim 5, said first actuating means including a first lever swingably mounted in said casing, said second actuating means including a second lever swingably mounted in said casing in coaxial alignment with the swingable connection of said first lever.

8. In a reflex camera as claimed in claim 7, said mirror assembly including a holder swingably mounted in said casing and a mirror engaged with said holder, said second lever being in cooperative engagement with said holder.

9. In a reflex camera as claimed in claim 5, settable controlling means arranged for cooperation with said coupling means and said releasable locking means, said controlling means being movable between an inactive position and an active position for bringing said coupling means into disengaged condition and for bringing said locking means in releasing condition.

10. In a reflex camera as claimed in claim 9, second releasable locking means for holding said controlling means in its active position whereby said coupling means are held in their disengaged condition and said first locking means is held in its releasing condition.

11. In a reflex camera, the combination of: a casing, a light-reflecting mirror assembly swingably mounted in said casing for movements between an inoperative position and an operative position, actuatable driving means, an actuating arm swingably mounted in said casing in coaxial alignment with said mirror assembly, said driving means cooperating with said actuating arm for displacing same in a predetermined relationship to the actuation of said driving means, disengageable coupling means capable of operatively connecting said actuating arm with said mirror assembly for joint movements of said actuating arm and said mirror assembly whereby upon a movement of said actuating arm by said driving means the mirror assembly is moved from its inoperative position into its operative position, releasable locking means for holding said coupled actuating arm and mirror assembly in the operative position of the latter, said coupling means rendering said mirror assembly independent of said actuating arm and driving means when said coupling means are in disengaged condition, and biasing means acting on said mirror assembly for urging same into its inoperative position.

12. In a reflex camera as claimed in claim 11, said driving means including a member of a film winding device.

13. In a reflex camera as claimed in claim 11, said coupling means including a first coupling element arranged on said mirror assembly and a second coupling element arranged on said actuating arm, and said mirror assembly and said actuating arm are shiftable relative to each other for selective engagement and disengagement of said coupling elements.

14. In a reflex camera as claimed in claim 13, said mirror assembly being shiftable relative to said actuating arm in the direction of the axis of its swingable connection for a selective engagement and disengagement of said coupling means, and said actuating arm being axially immovable.

15. In a reflex camera as claimed in claim 13, said actuating arm being shiftable relative to said mirror assembly in the direction of the axis of its swingable connection for a selective engagement and disengagement of said coupling means, and said mirror assembly being axially immovable.

References Cited in the file of this patent

UNITED STATES PATENTS 2,352,177    Bolsey                  June 27, 1944

FOREIGN PATENTS 231,080    Switzerland             May 16, 1944

UNITED STATES PATENT OFFICE
CERTIFICATE OF CORRECTION

Patent No. 2,862,429  December 2, 1958

Paul Walter Hennig et al.

It is hereby certified that error appears in the printed specification of the above numbered patent requiring correction and that the said Letters Patent should read as corrected below.

Column 3, line 19, for "drive means" read -- driving means --; line 59, for "asesmbly" read -- assembly --; line 67, for "operative" read -- inoperati- Signed and sealed this 7th day of April 1959.

(SEAL)
Attest:

KARL H. AXLINE
Attesting Officer

ROBERT C. WATSON
Commissioner of Patents